United States Patent [19]

Murata et al.

[11] Patent Number: 4,635,213

[45] Date of Patent: Jan. 6, 1987

[54] METHOD OF ESTIMATING THE RESULT OF COLORATION AND OF REPRODUCING A GIVEN COLOR

[75] Inventors: Yukio Murata, Takatsuki; Masakazu Suzuka, Ibaraki, both of Japan

[73] Assignee: Sumitomo Chemical Co., Limited, Osaka, Japan

[21] Appl. No.: 704,041

[22] Filed: Feb. 21, 1985

[30] Foreign Application Priority Data

Feb. 21, 1984 [JP] Japan ............................. 59-32215

[51] Int. Cl.$^4$ ............................................. G01J 3/46
[52] U.S. Cl. ................................... 364/526; 356/402
[58] Field of Search ............... 356/402, 405, 406, 408, 356/425, 300; 364/526, 498

[56] References Cited

U.S. PATENT DOCUMENTS

| | | | |
|---|---|---|---|
| 3,601,589 | 8/1971 | McCarty | 364/526 |
| 3,916,168 | 10/1975 | McCarty et al. | 356/405 X |
| 4,029,419 | 6/1977 | Schumann, Jr. et al. | 364/526 X |
| 4,349,279 | 9/1982 | Jung | 364/526 X |

OTHER PUBLICATIONS

Derby, Jr., Roland E., "Applied Spectrophotometry (I) Color Matching with the Aid of the R Cam", American Dyestuff Reporter, pp. 550-557, Sep. 1952.

Cutler, A. E., "A New Colour-Matching Computer", JSDC, Dec. 1965, pp. 601-608.

Minato, Sachie, "Color Prediction of Pigmented Plastics Using Reference Color Method (I)", Journal of Faculty of Engineering Chiba University, Dec. 1967, vol. 18, No. 34, pp. 149-152.

*Primary Examiner*—William B. Perkey
*Attorney, Agent, or Firm*—Kerkam, Stowell, Kondracki & Clarke

[57] ABSTRACT

There are disclosed a color estimating method and a color reproducing method. Reference recipes of each colorant (i) having a know concentration $C_i$ are prepared and used to color a reference piece by each colorant recipe. Thereafter, the spectral reflectivity ($R_i'$) of each colored reference piece is measured, and the non-boundary reflectivity ($R_i$) is calculated from the measured spectral reflectivity ($R_i'$) and the boundary reflectivity ($Rg_i$) in the accordance with the following equation:

$$R_i = R'_i - Rg_i$$

Then, an optical density ($\theta o i$) of the colored layer is derived from the non-boundary reflectivity ($R_i$) and divided by the concentration ($C_i$) to calculate an optical density ($\alpha o i$) per unit colorant concentration, which is in turn multiplied by the concentration ($M_i$) of each colorant (i) in the given colorant recipes to obtain the optical density ($\theta i$) of each colorant (i) contained in the given colarant recipes. These optical densities ($\theta i$) for i colorants are summed to obtain the total optical density $\theta$mix. Thereafter, the spectral reflectivity ($R'$) of the possible colored material is obtained from the total optical density $\theta$mix, thereby estimating the color attained by the given colorant recipes.

18 Claims, 13 Drawing Figures

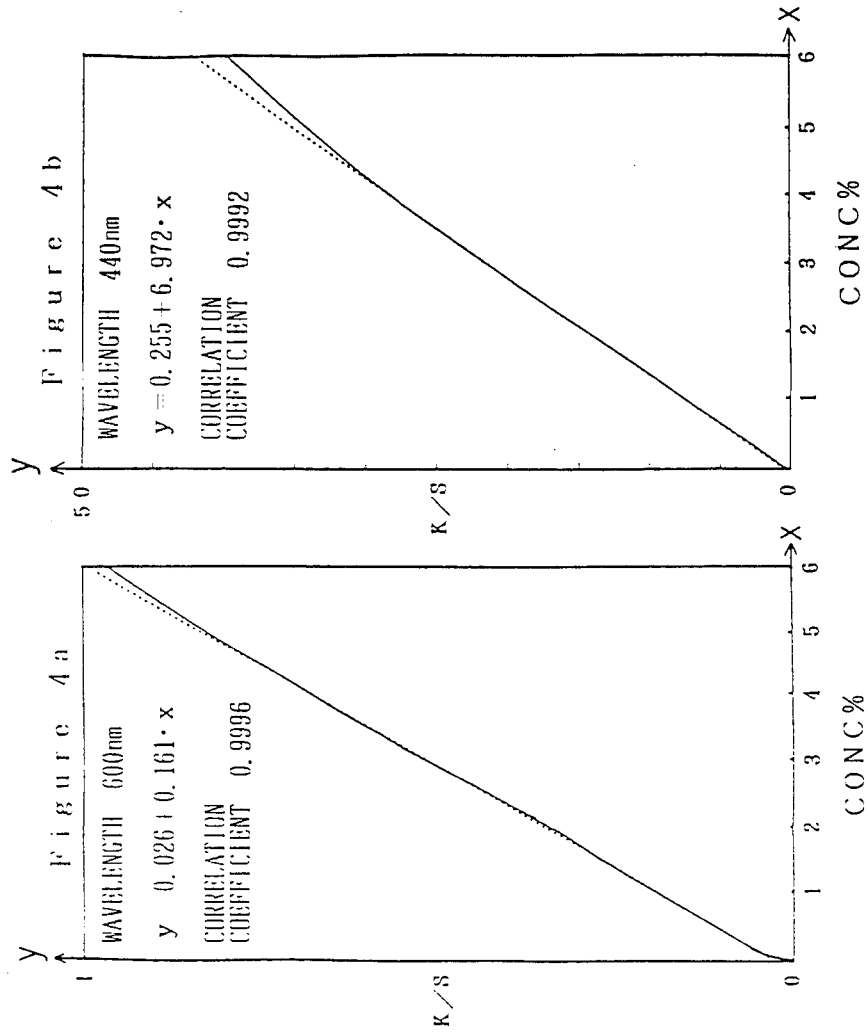

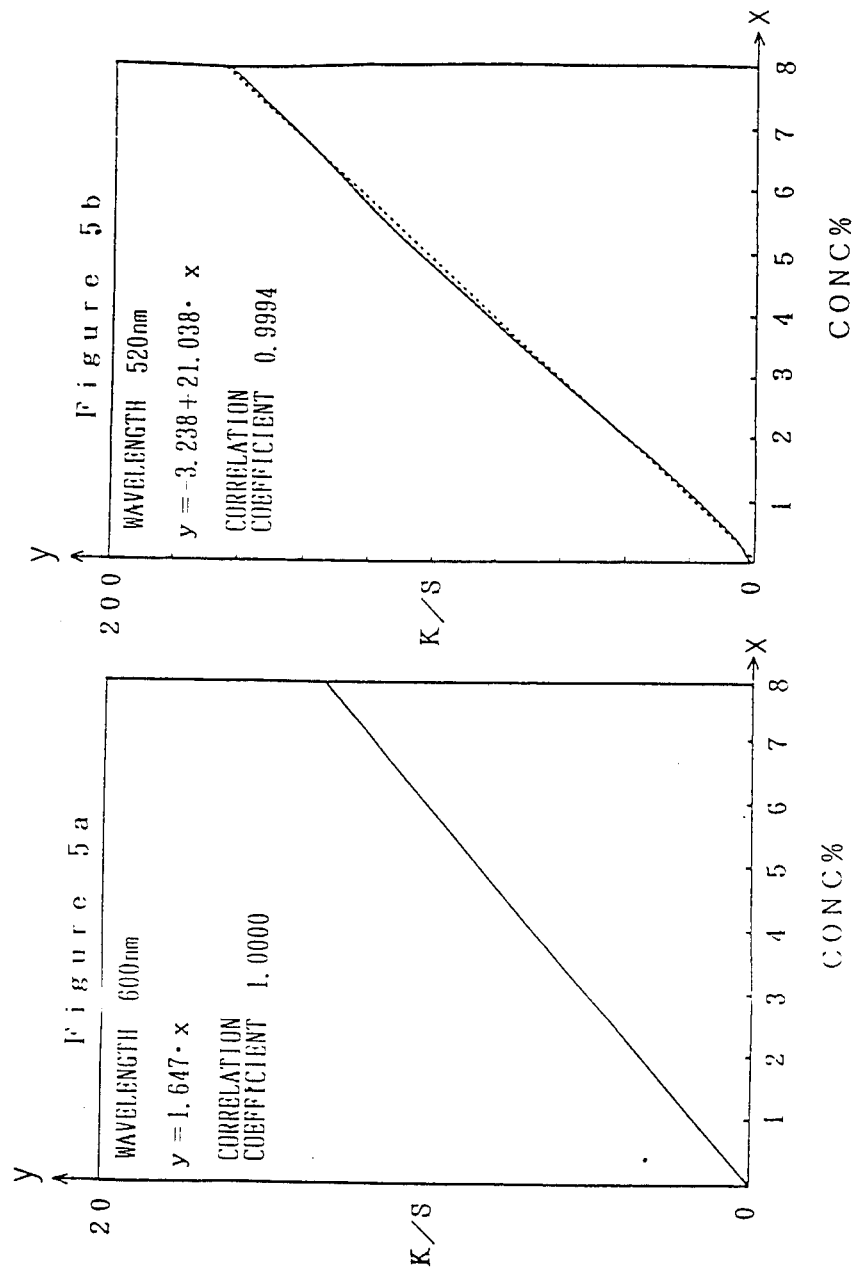

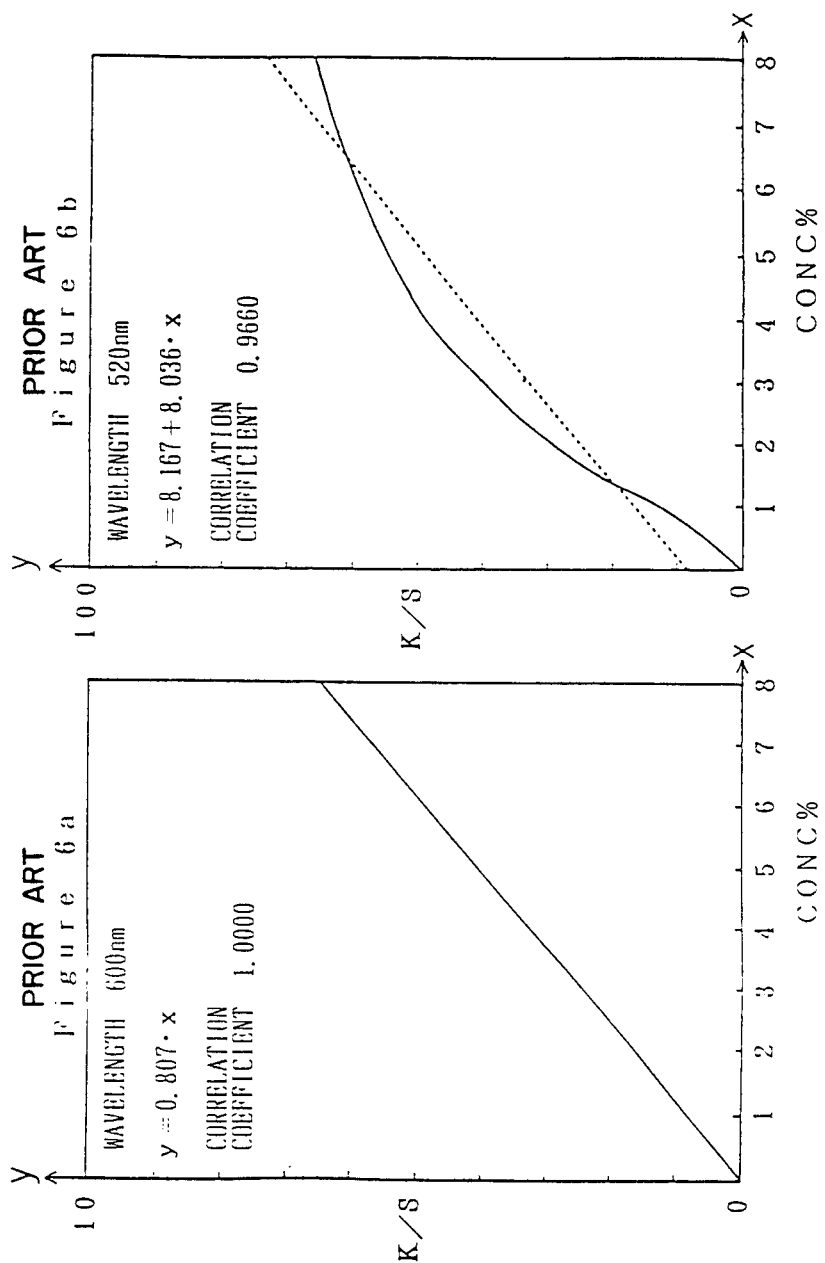

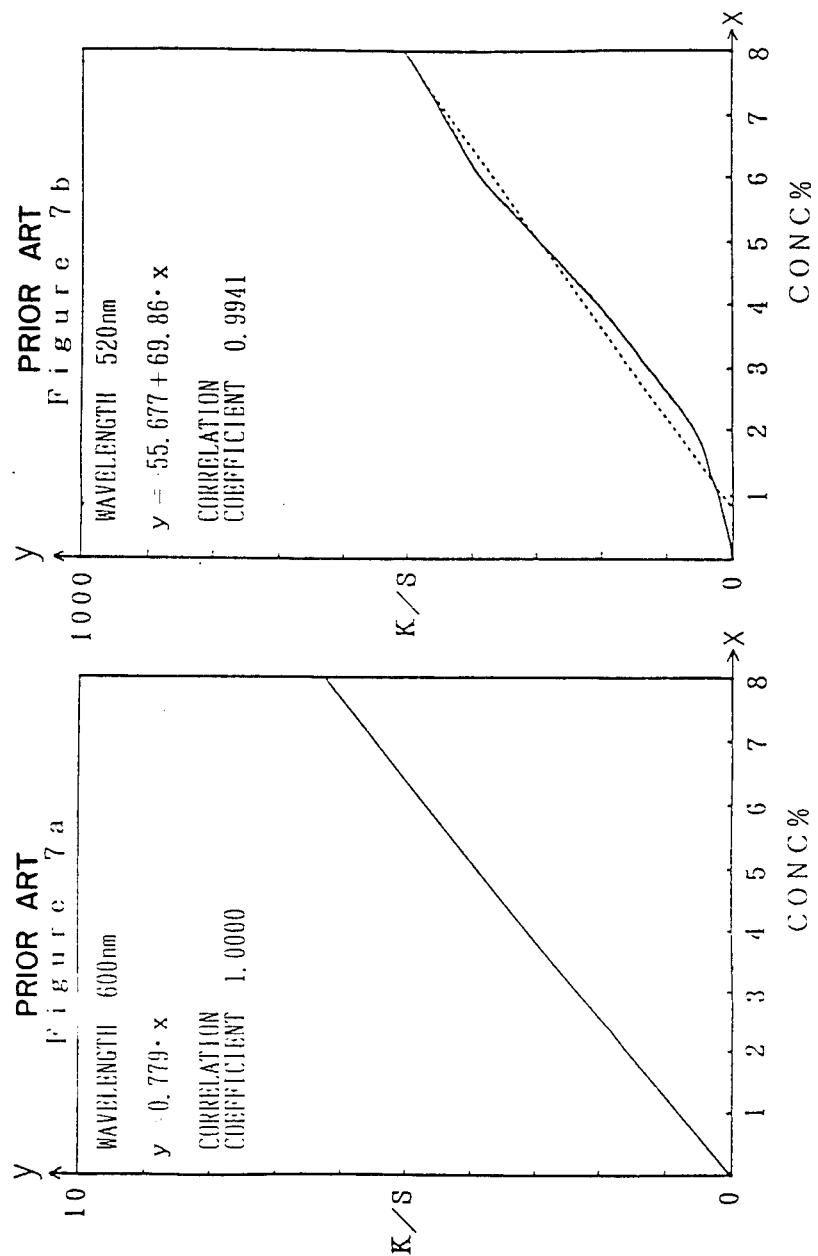

METHOD OF ESTIMATING THE RESULT OF COLORATION AND OF REPRODUCING A GIVEN COLOR

FIELD OF INVENTION

The present invention relates to a method for estimating the result of coloration, and more particularly, to methods for coloring yarn, cloth, paper and the like to a given color by use of colorants such as dyestuffs, pigments or the like, and methods of precisely estimating the result of such coloration.

BACKGROUND OF THE INVENTION

For example, when cloth, yarn, paper and the like are colored to a desired color or to the same shade as that of a given sample, it is necessary to prepare coloring compositions including a plurality of colorants which would be able to reproduce the given color. However, if the shade of the cloth actually colored by such coloring compositions is not the same as the given color, the coloration results in failure, and a lot of cloth thus colored would not be able to fulfil the requirements for user.

In the actual operation of coloring factories, therefore, a well-skilled engineer chooses a desired combination of colorants among a great number of known colorants and estimates the shade of a material or substrate colored by a mixture of the chosen colorants having a suitable ratio. Then, from various kinds of colorant compositions thus estimated, he selects the most suitable composition or recipes and actually colors a test piece by the selected colorant composition. The colored test piece is compared to the given reference colored sample. If the color of the test piece is not matched with the colored reference sample, the engineer attemps to modify the recipe of the colorant composition and repeats the same procedure as that mentioned above until the strict color matching is obtained.

The above color matching operation is very important and indispensable prior to actual coloring operation in coloring factories. As seen from the above, however, the manual color matching operation is very troublesome, and the precision and speed thereof greatly depend upon the experience and ability of the coloring engineer. In addition, although the engineer is extremely well-skilled, his treatment ability is very small because he has to pass through many trial-and-errors until he succeeds to reproduce the shade of the given sample. In practice, the engineer can treat only a few cases of color matching per day. Therefore, the production capacity of the coloring factories is completely and extremely limited because of the number and the treatment power of the color matching engineers.

In order to reduce the trial-and-errors for color matching, therefore, methods have previously been proposed to estimate, by use of a computer, the shade realized by a proposed recipe of colorants without actual coloring. If there are determined a few kinds of colorant recipes which would enable the shade of the given sample to be reproduced or closely approached before the actual coloring, the times of the trial-and-errors for color matching can be decreased to a large extent, so that the amount of color matching treated by one engineer would be greately increased.

At present, thereore, great efforts are paid to develop methods for computer aided color matching and to study the optical property of colored layers. On the other hand, spectrophotometers and microcomputers, which are required for computer aided color matching, have been recently greatly advanced and widely spread.

Thus, computer aid color matching is used to formulate the colorant composition in many coloring factories.

This computer aided color matching is generally called "CCM" in this specification. This CCM performed at present is foundamentally based on the theory of colored layer proposed by Kubelka and Munk in 1931.

In the Kubelka-Munk theory, a colored layer is analyzed by using one-dimension model in the direction of thickness and by assuming that each colorant contained in the colored layers has an inherent absorption coefficient K and scattering coefficient S. As a result, reflectivity of colored layer of different thicknesses is expressed in terms of the absorption coefficient K and the scattering coefficient S.

Assuming that the reflected light does not contain the light reflected by the base material or substrate to which a colorant is applied and also assuming that the reflected light is not influenced by the boundary between the air and the surface of the colored layer, the following Kubelka-Munk equation is concluded between the absorption coefficient K, the scattering coefficient S and the reflectivity $R_\infty$ of the colored layer at any given wavelength as follows:

$$K/S = (1 - R_\infty)^2 / 2R_\infty \tag{1}$$

When the CCM is actually performed, the above equation is used in combination with the following Duncan equation:

$$(K/S)_{mix} = \frac{Ko + \sum_{i=1}^{n} C_i K_i}{So + \sum_{i=1}^{n} C_i K_i} \tag{2}$$

where $(K/S)_{mix}$ is the ratio of K to S of a layer colored by a recipes containing n colorants which have the absorption coefficient $K_i$ and the scattering coefficient $S_i$, respectively and which are mixed with each other at the concentration $C_i$ respectively. Ko and So are respectively the absorption coefficient and the scattering coefficient of a base material or substrate bearing the colorants, such as vehicle, fiber and the like.

In fiber dyeing, since the scattering coefficient $S_i$ of a colorant is negligibly small as compared with the scattering coefficient So of the fiber itself, it is assumed that $S_i = 0$ and the Duncan equation (2) is modified as follows:

$$(K/S)_{mix} = Ko/So + \sum_{i=1}^{n} C_i \frac{K_i}{S_o} \tag{3}$$

This modified equation is also widely utilized in the paint and plastics industries, because it is applicable to the case of coloring a vehicle, resin or the like which includes a large amount of opaque white pigment such as titanium dioxide.

In the CCM operation, the $(K/S)_{mix}$ is calculated by using the above equation (3) and the calculated $(K/S)_{mix}$ is applied to the following equation which can be derived from the equation (1).

$$(K/S)_{mix} = (1-R_{mix})^2 / 2R_{mix} \quad (4)$$

As a result, there can be obtained the reflectivity $R_{mix}$ of the layer colored by the mixture of n colorants having the absorption coefficient Ki and a negligible scattering coefficient, respectively and also having concentration $C_i$, respectively.

Thereafter, the reflectivity $R_{mix}$ is compared with the reflectivity $R_s$ of the given color sample at all wavelengths in visible spectrum. If $R_{mix}$ is not consistent with $R_s$, the aforementioned calculation and comparison procedure are repeatedly performed by changing the concentration $C_i$ of the respective colorants, so that the reflectivity $R_{mix}$ of the resulting colorant mixture is consistent with the reflectivity $R_s$ of the given color sample at all wavelengths in visible spectrum. This is called "Isomeric Matching Method".

In addition to the Isomeric Matching Method, there is known a so-called "Metameric Matching Method". In this method, calculation is made to obtain, from the reflectivities $R_{mix}$ and $R_s$ of the proposed colorant recipe and the color sample at different wavelengths, the tristimulus values $X_{mix}$, $Y_{mix}$, $Z_{mix}$ and $X_s$, $Y_s$, $Z_s$ of Commission Internationale de l'Eclairage (CIE) under a certain CIE standard illuminant, and then there is calculated the concentrations $C_i$ of individual colorants making it possible to coincide the two sets of tristimulus values with each other.

The CCM has been actually performed by using the above methods. Consequently, the color matching operation is greatly labor-saved and time-saved in the coloring industries.

However, the previous methods actually involve various problems.

Namely, if it is desired to obtain a recipe of colorants for a deep color, the conventional CCM (which uses, for example, the aforementioned Kubelka-Munk equation, or other equations such as the Atkins equation, the Pineo equation, the Fink-Jensen equation, the Love-Oglesby-Gailey equation, etc. as shown in "COLOR research and application" Vol. 2, No. 3, 1977,) cannot provide the recipe which reproduces the same shade as that of a given color sample. Here, the term "deep color" means that the color has at least one strong absorption band in the visible spectrum. If a desired color becomes deeper, the inconsistency between the actual color and the estimated color becomes large.

The reason for this is considered as follows:

In a weak absorption band, the linear relation can be obtained between the colorant concentration and the value (K/S) calculated by using the Kubelka-Munk equation. However, in a strong absorption band, a linear relation cannot be obtained between the colorant concentration and the calculated value (K/S). FIGS. 1a, 1b and 2a, 2b show such two examples. In these Figures, the weak absorption band is 600 nm in wavelength and the strong absorption band is 440 nm. In addition, the solid line shows the relation between the concentration and the value (K/S) calculated in accordance with the conventional methods, and the dotted line shows the regression line of the solid line shown in the same Figures.

The above mentioned inconsistency is considered to result from the fact that the value (K/S) derived from the Kubelk-Munk equation or the other conventional method does not a good linearity against the concentration of colorant in the strong absorption region.

For the above reason, the CCM utilized at present cannot be successfully applied to coloring of high deepness.

Furthermore, when the color of a given concentration is estimated by using the spectral reflectivity of a reference colored material manufactured on the basis of a predetermined colorant recipe, the estimated spectral reflectivity is not correct because of lack of linearity as mentioned above. Therefore, strength evaluation is very troublesome in the quality control of colorants. Namely, it has to prepare a lot of colored smaples differing in concentration, and then to examine the relation between the concentration and the shade of the actually colored test piece.

SUMMARY OF THE INVENTION

Accordingly, it is one object of the present invention to provide a method for estimating the result of coloration, which overcomes the aforementioned disadvantages encountered in the prior art and which is effectively applicable to a deeper coloration.

Another object of the present invention is to provide a coloring method which enables color matching even at deep colors.

With the objects mentioned above, the inventors of the present application have made the study to seek a method of overcoming the above mentioned disadvantages. As a result, the inventors have found out a method to precisely estimate the reflectivity of the piece colored with a given recipe even for deep shade. Also, the inventors have succeeded in establishing a method of coloring fiber-containing products such as cloth, yarn, paper and the like by a computer aided color matching using the above spectral reflectivity estimating method.

Namely, according to the present invention there is provided a method of estimating, in terms of spectral reflectivity, the result of coloration by a given colorant recipe. This method comprises the steps of:

(a) coloring reference pieces by each colorant i contained in the given recipe, with plural steps of concentration Ci;

(b) measuring the spectral reflectivity ($R'_i$) of each colored reference piece and also deriving the non-boundary reflectivity ($R_i$) from the said spectral reflectivity ($R'_i$) and the boundary reflectivity ($R_{gi}$) in the accordance with the following equation:

$$R_i = R'_i - R_{gi}$$

(c) deriving an optial density ($\theta_{oi}$) of the colored layer of each colored reference piece from said non-boundary reflectivity ($R_{oi}$) of the same colored reference piece according to a known equation (e.g. Kubelka-Munk equation), and also calculating an optical density ($\alpha_{oi}$) per unit colorant concentration by dividing the optical density ($\theta_{oi}$) by said concentration ($C_i$);

(d) calculating an optical density ($\theta_i$) of each colorant (i) contained in said given colorant recipe by multiplying the optical density ($\alpha_{oi}$) per unit concentration of said colorant (i) by the concentration ($M_i$) of said colorant (i) in said given recipe;

$$\theta_i = \alpha_{oi} \cdot M_i$$

(e) summing the optical density ($\theta_i$) for i colorants contained in said given colorant recipe to obtain the total optical density $\theta$mix:

$$\theta\text{mix} = \Sigma \theta i$$

and (f) calculating the spectral reflectivity (R') of said possible colored material from said total optical density $\theta$mix, thereby estimating the color attained by the given colorant recipe.

Furthermore, according to the present invention, there is provided a method for reproducing a given color, characterized by the steps of:

(a) coloring reference pieces by each reference colorant (i) with plural steps of concentration Ci.

(b) measuring the spectral reflectivity ($R_i'$) of each colored reference piece and also deriving the non-boundary reflectivity ($R_i$) from the said spectral reflectivity ($R_i'$) and the boundary reflectivity ($Rg_i$) in the accordance with the following equation:

$$R_i = R'_i - Rg_i$$

(c) deriving an optial density ($\theta oi$) of the colored layer of each colored reference piece from said non-boundary reflectivity ($R_{oi}$) of the same colored reference piece according to a known equation, and also calculating an optical density ($\alpha oi$) per unit colorant concentration by dividing the optical density ($\theta oi$) by said concentration ($C_i$);

(d) assuming a tentative color matching recipe (e) calculating an optical density ($\theta i$) of each colorant (i) contained in said tentative colarant recipe by multiplying the optical density ($\alpha oi$) per unit concentration of said colorant by the concentration ($M_i$) of said each colorant (i);

$$\theta i = \alpha oi \cdot M_i$$

(f) summing the optical density ($\theta i$) for i colorants contained in said given colorant recipes to obtain the total optical density $\theta$mix:

$$\theta\text{mix} = \Sigma \theta i$$

(g) calculating the spectral reflectivity $(R')_{mix}$ of said possible colored material from said total optical density $\theta$mix, thereby estimating the color attained by said tentative colorant recipe.

(h) comparing said calculated spectral reflectivity $(R')_{mix}$ of said possible colored material with the spectral reflectivity of said given color;

(i) repeatedly performing the above steps (e) to (g) by changing the concentration of the respective colorants contained in said colorant recipe until said calculated spectral reflectivity is substantially consistent with the spectral reflectivity of said given color so as to obtain an optimum recipe;

(j) performing coloration by using said optimum colorant recipe.

In the above color estimating method and the coloring method of the present invention, said boundary reflectivity can be calculated on the basis of the following equation:

$$R_g = f_2 \frac{(N-1)^2 + [f_1 \cdot (K/S) \cdot N]^2}{(N+1)^2 + [f_1 \cdot (K/S) \cdot N]^2}$$

where (K/S) is the Kubelka-Munk function resulting from the spectral reflectivity which eliminates influence of the boundary reflectivity, and $f_1$ is a coefficient for converting the value (K/S) into the absorption coefficient K.

$f_2$ is a correction coefficient for the boundary reflectivity.

N is the refractivity of the colored layer.

In this case, it can be assumed that the coefficient $f_1$ is about 0.04 and the coefficient $f_2$ is in a range of 0 to 1.

Specifically, said coefficients $f_1$ and $f_2$ for each colorant can be determined by the steps of:

(a) preparing a plurality of recipes j having known concentration ($M_j$) differing from each other;

(b) coloring a plurality of reference substrates by said recipes, respectively;

(c) measuring the spectral reflectivity $R'_j$ of each colored reference substrate under at least one strong absorption wavelength and one weak absorption wavelength;

(d) assuming suitable values for the coefficients $f_1$ and $f_2$;

(e) applying the following equation with each measured spectral reflectivity $R'_j$ by the recipe j, for obtaining the value $(K/S)_j$ which fulfils the same equation;

$$R'_j = 1 + (K/S)_j - \sqrt{(K/S)_j^2 + 2(K/S)_j} + f_2 \frac{(N-1)^2 + [f_1 \cdot (K/S)_j \cdot N]^2}{(N+1)^2 + [f_1 \cdot (K/S)_j \cdot N]^2}$$

(f) analyzing the relation between the value $(K/S)_j$ and the concentration ($M_j$) and statistically seeking the degree of correlation;

(g) repeatedly performing the above procedure by changing the values of the coefficients $f_1$ and $f_2$; and (h) selecting, among the tried values of $f_1$ and $f_2$, the optimum values which provide a good linear relation between the value $(K/S)_j$ and the concentration.

Furthermore, in one embodiment, said spectral reflectivity $(R)_{mix}$ of said possible coloraed material is obtained on the basis of the following equation:

$$(R)_{mix} = 1 + (K/S) - \sqrt{(K/S)^2 + 2(K/S)} + f_2 \frac{(N-1)^2 + [f_1 \cdot (K/S) \cdot N]^2}{(N+1)^2 + [f_1 \cdot (K/S) \cdot N]^2}$$

In another embodiment, said spectral reflectivity $(R)_{mix}$ of said possible coloraed material is obtained by the steps of:

(a) deriving a boundary reflectivity $(R_g)_{mix}$ of said possible colored material from said total optical density ($\theta$mix);

(b) deriving a non-boundary reflectivity $(R)_{mix}$ of said possible colored material from said total optical density ($\theta$mix); and (c) calculating the spectral reflectivity $(R')_{mix}$ of said possible colored material from said boundary reflectivity $(R_g)_{mix}$ and said non-boundary reflectivity coefficient $(R)_{mix}$ on the basis of the equation $$(R)_{mix} = (R')_{mix} - (R_g)_{mix}.$$

The above and other object, features and advantages of the prsent invention will become apparant from the following detailed description with reference to the accompanying drawings.

BRIEF DESCRIPTION OF THE DRAWINGS

FIGS. 1a and 1b are graphs showing the relation between the colorant concentration and the value (K/S) calculated on the basis of the Kubelka-Munk equation from the measured spectral reflectivities of polyester cloths dyed with the dyestuff "Sumikaron Yellow Brown S-2RL" at various concentrations, in which FIG. 1a shows the case of a wavelength in a weak absorption band and FIG. 1b shows the case of a wavelength in a strong absorption band, and in which the solid line shows the relation between the concentration and the calculated value (K/S) and the dotted line shows the regression line obtained from the regresion analysis of the solid line;

FIGS. 4a and 4b are graphs similar to FIGS. 1a and 1b, respectively but showing the relation between the colorant concentration and the value (K/S) calculated on the basis of the present invention equation under the same condition as the case of FIGS. 1a and 1b; and FIGS. 5a and 5b, 6a and 6b, and 7a and 7b are graphs similar to FIGS. 1a and 1b, respectively, but showing the relation between the concentration and the value (K/S) calculated on the basis of the present invention equation, the Kubelka-Munk equation, and the Pineo equation respectively, from the measured spectral refectivities of cotton cloth dyed with the dyestuff "Sumifix Supra Brilliant Red 3BF" at various concentrations.

DETAILED DESCRIPTION

Figure 3:
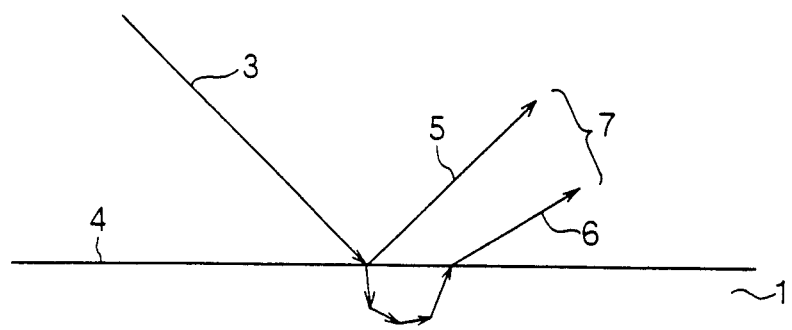
FIG. 3 is a diagrammatic sectional view of a colored layer which illustrates the boundary reflection on the colored layer.

Referring to FIG. 3, there is shown a colored layer 1 which may be a fiber-containing product such as cloth, yarn, paper and the like. When a light 3 is incident upon the free surface 4 of the colored layer 1, a portion of the incident light 3 is reflected by the free surface 4, i.e., the boundary between the air and the colored layer 1, as shown by Reference Numeral 5, and the other portion penetrates into the colored layer 1. The penetration light is lost in one part in the colored layer 1 and is issued in the other part from the colored layer 1 by the scattering in the colored layer 1, as shown by Reference Numeral 6. Therefore, the reflected light 7 consists of the boundary reflection light 5 and the non-boundary reflection light 6.

Accordingly, the spectral reflectivity R' of a colored layer can be expressed as follows:

$$R' = R_g + R \quad (5)$$

where $R_g$ is the reflectivity determined by various optical conditions in the boundary between the air and the colored layer ($R_g$ is colled "boundary reflectivity" in the specification); and R is the reflectivity which is not influenced by the boundary reflection. (R is called "non-boundary reflectivity" in the specification)

The above boundary reflectivity $R_g$ can be considered to correspond to the Fresnel reflectivity (r). According to the Fresnel reflectivity, assuming that the incident light is perpendicular to the surface of the colored layer, the reflectivity (r) of the perpendicular reflection at a non-absorbing layer is expressed:

$$R_g = r = \frac{(N-1)^2}{(N+1)^2}$$

and the reflectivity (r) of a strongly absorbing layer is expressed:

$$R_g = r = \frac{(N-1)^2 + (KN)^2}{(N+1)^2 + (KN)^2}$$

where N and K are the refractivity and the absorption coefficient of the colored layer, respectively.

Therefore, if the refractivity N or the absorption coefficient K becomes large, the Fresnel reflectivity becomes large. Namely, the boundary reflectivity $R_g$ cannot be precisely obtained only from the Fresnel reflectivity. Therefore, the boundary reflectivity $R_g$ should be modified. For this purpose, in the present invention, there is introduced with a correction coefficient $f_2$ for the boundary reflectivity. Namely, the Fresnel equation for the strongly absorbing layer is modified as follows:

$$R_g = r = f_2 \frac{(N-1)^2 + (KN)^2}{(N+1)^2 + (KN)^2} \quad (6)$$

In this equation, the term "KN" can be expressed:

$$KN = F_1 \cdot (K/S) \cdot N \quad (6')$$

where (K/S) is the Kubelka-Munk function sought from the non-boundary reflectivity R, namely the spectral reflectivity R' which eliminates influence of the boundary reflectivity $R_g$, and $f_1$ is a coefficient for converting the value (K/S) into the absorption coefficient K.

Therefore, substituting the equations (6) and (6') to the equation (5), the following equation (7) can be obtained.

$$R' = R + f_2 \frac{(N-1)^2 + [f_1 \cdot (K/S) \cdot N]^2}{(N+1)^2 + [f_1 \cdot (K/S) \cdot N]^2} \quad (7)$$

On the other hand, the non-boundary reflectivity R can be expressed by the following equation in accodance with the Kubelka-Munk function.

$$R = 1 + (K/S) - \sqrt{(K/S)^2 + 2(K/S)} \quad (8)$$

Accordingly, the equation (7) can be modified as follows:

$$R' = 1 + (K/S) - \sqrt{(K/S)^2 + 2(K/S)} + \quad (9)$$

-continued $$f_2 \frac{(N-1)^2 + [f_1 \cdot (K/S) \cdot N]^2}{(N+1)^2 + [f_1 \cdot (K/S) \cdot N]^2}$$

Thus, if the value (K/S) fulfilling the above equation (9) can be obtained, the non-boundary reflectivity R can be obtained in accordance with the aforementioned Kabelka-Munk equation (8).

The present invnetion is based on the above finding. Namely, the color estimating method of the present invention is as follows:

(1) First step:

For a given colorant (i), a plurality of reference colored substrates are prepared in accordance with the corresponding number of recipes which have concentrations ($C_i$) different from one another, and each of the reference colored substrates is measured for the spectral reflectivity $R'_i$ over all visible wavelength range, at least at one strong absorption band and one weak absorption band. Then, assuming suitable values for the correction coefficients $f_1$ and $f_2$ (from experience, $f_1$ is preferably about 0.04, and $f_2$ is between 0 and 1 and is approached to 1 when the surface of the substrate becomes flat), and also applying the equation (9) with the refractivity N of the substrte and the measured spectral reflectivities $R'$ at the above different concentrations ($C_i$), there is sought the value $(K/S)_i$ which fulfils the equation (9). Thereafter, the relation between the value $(K/S)_i$ and the concentration ($C_i$) is analyzed and the degree of correlation is calculated sought by use of a statistical method.

The above procedure is repeatedly performed by changing the values of the correction coefficients $f_1$ and $f_2$. From among the tried values of $f_1$ and $f_2$ are selected the optimum values which provide a good linear relation between the value (K/S) and the concentration, independently of wavelength. Then, the value $(K/S)_i$ at different concentrations is calculated by using the optimum values of $f_1$ and $f_2$ on the basis of the equation (9).

Thus, the boundary reflectivity $R_g i$ and the non-boundary reflectivity $R_i$ can be obtained from the above equations (5) to (9) and the value (K/S) as determined above.

(2) Second Step:

The above value (K/S) can be deemed to be the optical density $\theta oi$ of the colorant (i). Therefore, by dividing the value (K/S) by the concentration $C_i$, the optical density $\alpha oi$ per unit colorant concentration can be obtained.

$$\theta oi = K/S = (1 - R_i)^2/2R_i \quad (1')$$

$$\alpha oi = [(K/S)i - (K/S)_o]/C \quad (10)$$

where $(K/S)_o$ is the Kubelka-Munk function of the substrate itself.

(3) Third Step:

The above first and second steps are repeated for all colorants contained in a possible recipe. As a result, the value (K/S), the boundary reflectivity $R_g i$, the non-boundary reflectivity $R_i$ and the optical density $\alpha oi$ per unit colorant concentration are prepared for each colorant.

(4) Fourth Step:

An optical density $(K/S)i$ of each colorant (i) contained in a given colorant recipe are calculated by multiplying the optical density ($\alpha oi$) per unit concentration of the same colorant by the concentration ($M_i$) of said colorant (i).

$$(K/S)_i = \alpha oi \cdot M_i \quad (11)$$

(5) Fifth Step:

The optical densities $(K/S)_i$ for all colorants (i) contained in the given colorant recipe are summed to obtain the total optical density $(K/S)_{mix}$ of a possible colored substrate in accordance with the given colorant recipe. If necessary, the optical density $(K/S)_O$ of the substrate is added.

$$(K/S)_{mix} = (K/S)_0 + \sum_{i=1}^{n} (K/S)_i \quad (12)$$

(6) Sixth Step:

A boundary reflectivity $R_g mix$ of the possible colored material is calculated from the total optical density $(K/S)_{mix}$ in accordance with the equations (6) and (6'). At this time, the coefficients $f_1 mix$ and $f_2 mix$ for the colorant mixture in accordance with the recipe are not respectively the same as the coefficients $f_1$ and $f_2$ for each colorant. As the coefficients $f_1 mix$ and $f_2 mix$, therefore, there can be used the respective arithmetical means of the coefficients $f_1$ and $f_2$ of all colorants contained in the colorant mixture, or the averages of all colorant's coefficient $f_1$ and $f_2$ weighted by the concentration $M_i$ of each colorant (i).

(7) Seventh Step:

A non-boundary reflectivity $R_{mix}$ of the possible colored material is calculated from the total optical density $(K/S)_{mix}$ in accordance with the equation (8).

(8) Eighth Step:

A spectral reflectivity $R'_{mix}$ of the possible colored material is calculated from the boundary reflectivity $R_{mix}$ and the non-boundary reflection coefficient $R_{mix}$ in accordance with the equation $(R)_{mix} - (R')_{mix} - (R_g)_{mix}$, thereby estimating the spectral reflectivity of a possible colored material manufactured in accordance with the given colorant recipe.

The above sixth to eighth steps can be replaced by only one step of applying the total optical density $(K/S)_{mix}$ and the correction coefficients $f_1 mix$ and $f_2 mix$ to the equation (9) so as to directly obtain the spectral reflectivity $R'_{mix}$ of a possible colored mateiral.

In the above procedure, the value K/S, i.e., the optical density $\theta oi$ is derived on the basis of the Kubelka-Munk equation (1) or (1'). But, the optical density $\theta oi$ can be obtained by other equations. For example, the following Pineo equation can be used.

$$\theta_{oi} = \frac{(1-R)^2}{2(1-r)(R-r)}$$

By utilizing the above mentioned color estimating method of the present invention, it is possible to reproduce the shade of a given color sample.

Namely, the spectral reflcetivity of the given sample is optically measured, and if necessary, on the basis of the measured spectral reflectivity $R_s$, the tristimulus value $X_s$, $Y_s$ and $Z_s$ of the given color are calculated.

On the other hand, since it is possible to match the given color by means of widely different colorant combinations, one colorant combination is suitably chosen. For individual colorants to be contained in the chosen colorant combination, the above mentioned first and second steps are performed. Then, in the chosen colorant combination there is suitably determined a tentative concentration of each colorant which can be considered to reproduce the given color. On the basis of the tentative recipe, the above mentioned fourth to eighth steps are executed to estimate the spectral reflectivity $R'_{mix}$ of the tentative colorant recipe.

Thereafter, the calculated spectral reflectivty $R'_{mix}$ is compared with the measured reflectivty $R_s$ of the given sample. Otherwise, calculation is made on the basis of the spectral reflectivity $R'_{mix}$ thus obtained, so as to seek the tristimulus values $X_{mix}$, $Y_{mix}$ and $Z_{mix}$ of the possible colored material in accordance with the tentative recipe. These calculated tristimulus values $X_{mix}$, $Y_{mix}$ and $Z_{mix}$ are compared with the tristimulas value $X_s$, $Y_s$ and $Z_s$ of the given color sample.

In accordance with a non-linear optimizing method such as Newton-Lapson method, and by changing the concentration of each colorant contained in the chosen colorant combination, the aforementioned procedure is repeatedly performed until there is obtained an optimum colorant recipe which enables to provide the calculated $R'_{mix}$ substantially consistent with the measured $R_s$, or the tristmulus values $X_{mix}$, $Y_{mix}$ and $Z_{mix}$ consistent with $X_s$, $Y_s$ and $Z_s$.

As a result, color matching is realized, and therefore, by using the colorant recipe thus obtained it is possible to reproduce the same color as that of the given color sample.

Next, specific examples will be described in detail.

EXAMPLE 1

Reference color pieces were prepared by dyeing polyester cloths with the disperse dyestuff under the trade name "Sumikaron Yellow Brown S-2RL" available from Sumitomo Chemical Company, Limited, at the concentrations of 0.17, 0.33, 0.67, 2, 4, 6% on weight of fiber (abbreviated to %o.w.f. hereinafter).

For each of the reference color pieces thus prepared, the spectral reflectivity $R'$ is measured at wavelengths of 440 nm in a strong absorption band and at 600 nm in a weak absorption band. On the basis of the measured spectral reflectivity $R'$ and using the refractivity of polyester fiber $N=1.7$, the value $(K/S)$ was calculated in accordance with the equation (9) by variously changing the coeffients $f_1$ and $f_2$. The thus obtained values $(K/S)$ were correlation-analyzed at each concentration. As the optimum value there were selected a pair of values $f_1$ and $f_2$ which are common to the respective concentrations and independently of wavelength and which provide the maximum correlation coefficient so that a sufficient linear relation is obtained between the value $(K/S)$ and the concentration. By using the optimum values of $f_1$ and $f_2$, the value $(K/S)$ was calculated at different concentrations.

FIGS. 4a and 4b are graphs showing by a solid line the result thus obtained in accordance with the present invention. In these figures, a dotted line shows the regression line and the equation shown therein is the function expressed by the regression line.

The following table 1 shows the correlation between (1) the relation curve between the conentration and the value (K/S) obtained as mentioned above in accordance with the present invention and (2) the straight regression line of that relation curve, in comparison to the cases applied with Kubelka-Munk equation and the Pineo equation.

TABLE 1

Figure 1:
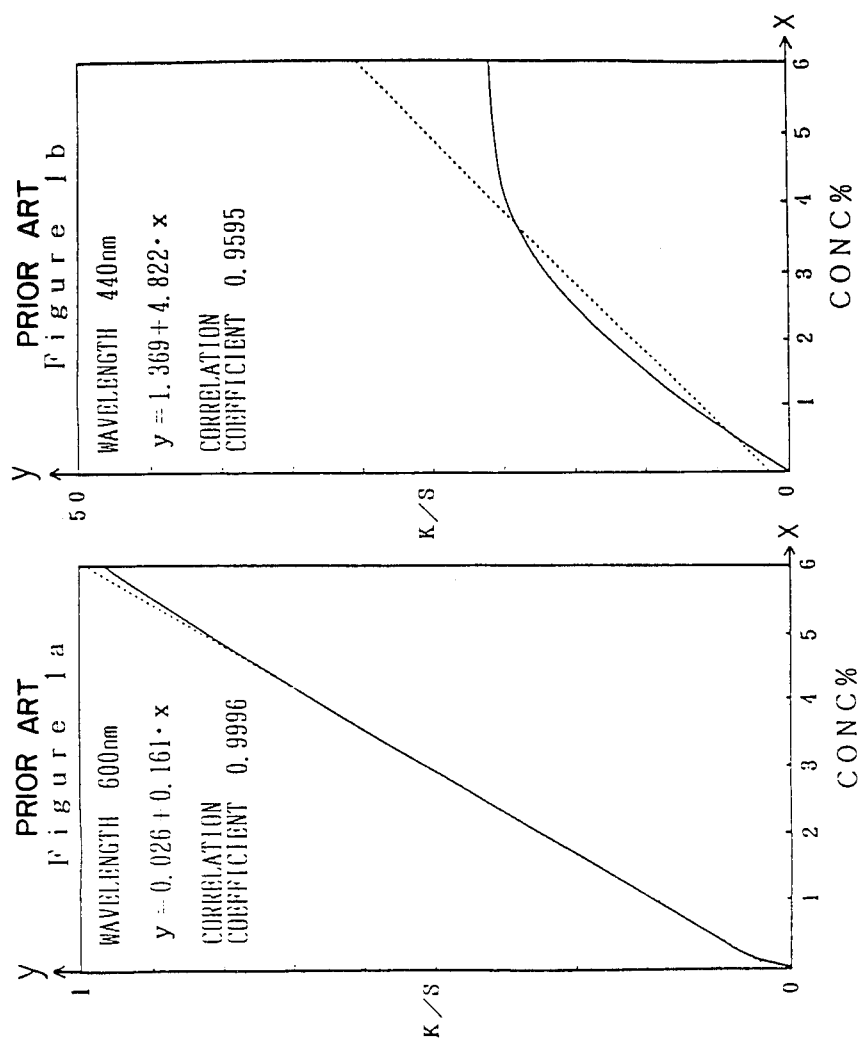
Figure 2:
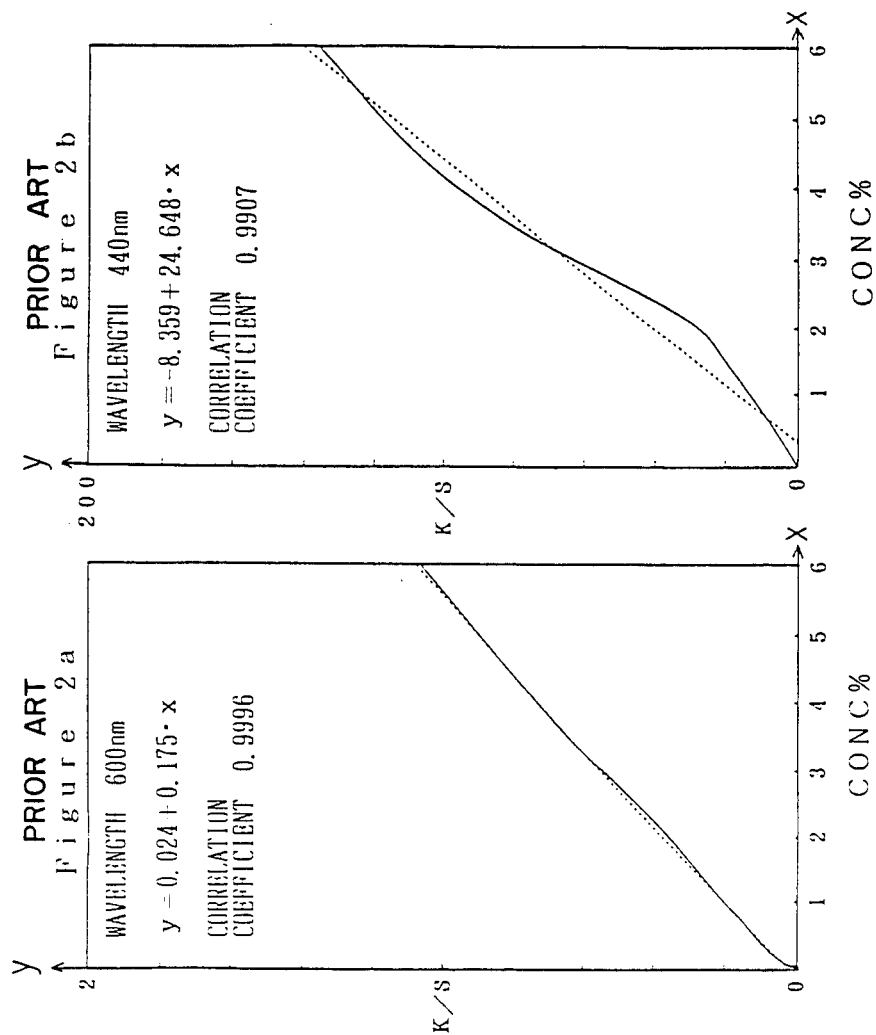
FIGS. 2a and 2b are graphs similar to FIGS. 1a and 1b, respectively, but showing the relation between the colorant concentration and the value (K/S) calculated on the basis of the Pineo equation under the same condition as the case of FIGS. 1a and 1b.

| | Equation, Condition and Correction Coefficient | Correlation Coefficient | | |
|---|---|---|---|---|
| | | 600 nm | 440 nm | |
| Invention | Equation (9) $N = 1.7$ $f_1 = 0.04$ $f_2 = 0.019$ | 0.9996 | 0.9992 | FIG. 4 |
| Kubelka-Munk | $K/S = \dfrac{(1-R)^2}{2R}$ | 0.9996 | 0.9595 | FIG. 1 |
| Pineo | $K/S = \dfrac{(1-R)^2}{2(1-r)(R-r)}$ $(r = 0.019)$ | 0.9996 | 0.9907 | FIG. 2 |

It is apparent from Table 1 and FIGS. 1, 2 and 4 that the relation between the value (K/S) and the concentration obtained in accordance with the present invention is extremely excellent in linearity as compared with those obtained by the conventional methods.

EXAMPLE 2

Reference color pieces were prepared by dyeing a unmercerized cotton knit with the reactive dyestuff under the trade name "Sumifix Supra Brilliant Red 3BF" available from Sumitomo Chemical Company, Limited, at the concentrations of 0.5, 1.0, 2.0, 4.0, 6.0, 8.0% o.w.f.

For each of the reference color pieces thus prepared, the spectral reflectivity $R'$ is measured at wavelengths of 520 nm in a strong absorption band and 600 nm in a weak absorption band. On the basis of the measured spectral reflectivity $R'$ and using the refractivity of cotton fiber $N=1.5$, the value $(K/S)$ was calculated in accordance with the equation (9) by variously changing the coefficients $f_1$ and $f_2$. The thus obtained values $(K/S)$ were correlation-analyzed at each concentration. There are selected as the optimum value a pair of values $f_1$ and $f_2$ which are common to the respective concentration and independently of wavelength and which provide the maximum correlation coefficient so that a sufficient linear relation is obtained between the value $(K/S)$ and the concentration. By using the optimum values of $f_1$ and $f_2$, the value $(K/S)$ was calculated at different concentrations.

FIGS. 5a and 5b show the relation between the conentration and the value (K/S) obtained in this example. FIGS. 6a, 6b and 7a, 7b show the relation between the concentraion and the value (K/S) obtained in accordance with the Kubelka-Munk and the Pineo, respectively, under the same condition as that in the Example 2. In each of these figures, the dotted line shows the regression line and the equation shown therein is the function of the regression line.

The correltion coefficient achieved in the cases of FIGS. 5a to 7b are shown in the following Table 2.

TABLE 2

| | Equation, Condition and Correction Coefficient | Correlation Coefficient | | |
|---|---|---|---|---|
| | | 600 nm | 520 nm | |
| Invention | Equation (9) $N = 1.5$ $f_1 = 0.04$ $f_2 = 0.01$ | 1.0000 | 0.9994 | FIG. 5 |
| Kubelka-Munk | $K/S = \dfrac{(1-R)^2}{2R}$ | 1.0000 | 0.9660 | FIG. 6 |
| Pineo | $K/S = \dfrac{(1-R)^2}{2(1-r)(R-r)}$ | 1.0000 | 0.9941 | FIG. 7 |

TABLE 2-continued

| Equation, Condition and Correction Coefficient | Correlation Coefficient |  |
|---|---|---|
|  | 600 nm | 520 nm |
| (r = 0.011) | | |

It is apparent from Table 2 and FIGS. 5, 6 and 7 that the relation between the value (K/S) and the concentration obtained in accordance with the present invention is extremely excellent in linearity as compared with those obtained by the conventional methods.

EXAMPLE 3

Attempt was made to estimate the color realized by a mixture of three disperse dyestuffs under the trade names "Sumikaron Yellow SE-RPD", "Sumikaron Red SE-RPD", and "Sumikaron Blue SE-RPD" respectively available from Sumitomo Chemical Company, Limited.

Firstly, similarly to Example 1, the optimum coefficients $f_1$ and $f_2$ which provide a sufficient linear relation between the concentration and the value (K/S) was sought for each dyestuff. Thereafter, assuming the concentration of 0.25%, the values (K/S) for the respective dyestuffs were calculated and summed to obtain the value (K/S) mix for the dyestuff mixture containing the three dyestuffs of the concentration of 0.25%, respectively. Furthermore, the coefficients $f_1$mix and $f_2$mix for the dyestuff mixture were derived by obtaining the arithmetical average of the coefficients $f_1$ and $f_2$ for respective dyestuffs, since the three dyestuff are mixed at the same ratio. As a result, $f_1$mix=0.04 and $f_2$mix=0.017. Setting N=1.7, there was sought the spectral reflectivity $R'_{mix}$ for the dyestuff mixture.

On the other hand, a polyester fabric dyed with the mixture of the above three dyestuffs respectively at the concentration of 0.25% is actually prepared. The spectral reflectivity of the actually dyed cloth is measured.

Table 3 shows the above mentioned spectral reflectivity estimated in accordance with the present invention in comparison to the measured spectral reflectivity and also in comparison to the spectral reflectivity estimated in the Kubelka-Munk equation.

Similarly, there were estimated and actually measured the spectral reflectivities of the polyester cloths dyed by three dyestuff mixtures containing the above mentioned three dyestuffs at the same ratio but at different concentrations of 0.5%, 1.0% and 2.0%, respectively. The result of these attempts are shown in Tables 4 to 6.

TABLE 3

| | PRIOR ART | | (0.25%) INVENTION | | | |
|---|---|---|---|---|---|---|
| | ESTIMATED SPECTRAL REFLECTIVITY OBTAINED BY KUBELKA-MUNK | | CORRECTED VALUE OF BOUNDARY REFLECTIVITY | ESTIMATED SPECTRAL REFLECTIVITY (R') | | MEASURED SPECTRAL REFLECTIVITY |
| WAVELENGTH (nm) | $X_i$ | $\|X - X_i\|$ | (Rg) | $X_i$ | $\|X - X_i\|$ | X |
| 400 | 19.78 | 1.00 | 0.1032 | 19.81 | 0.97 | 20.78 |
| 420 | 12.29 | 0.64 | 0.1096 | 12.32 | 0.61 | 12.93 |
| 440 | 9.20 | 0.45 | 0.1187 | 9.25 | 0.40 | 9.65 |
| 460 | 9.24 | 0.19 | 0.1185 | 9.29 | 0.14 | 9.43 |
| 480 | 12.69 | 0.62 | 0.1089 | 12.73 | 0.58 | 13.31 |
| 500 | 13.35 | 0.67 | 0.1079 | 13.38 | 0.64 | 14.02 |
| 520 | 13.42 | 0.66 | 0.1078 | 13.45 | 0.63 | 14.08 |
| 540 | 14.28 | 0.79 | 0.1068 | 14.32 | 0.75 | 15.07 |
| 560 | 15.02 | 0.88 | 0.1060 | 15.06 | 0.84 | 15.90 |
| 580 | 16.10 | 1.11 | 0.1051 | 16.12 | 1.09 | 17.21 |
| 600 | 16.27 | 1.18 | 0.1050 | 16.28 | 1.17 | 17.45 |
| 620 | 16.46 | 1.19 | 0.1049 | 16.47 | 1.18 | 17.65 |
| 640 | 16.62 | 1.10 | 0.1048 | 16.68 | 1.09 | 17.72 |
| 660 | 21.21 | 1.12 | 0.1027 | 21.22 | 1.11 | 22.33 |
| 680 | 33.93 | 1.12 | 0.1012 | 33.96 | 1.09 | 35.05 |
| 700 | 51.48 | 0.93 | 0.1009 | 51.58 | 0.83 | 52.41 |
| $\Sigma(X - X_i)^2$ | | 12.94 | | | 12.15 | |

TABLE 4

| | PRIOR ART | | (0.5%) INVENTION | | | |
|---|---|---|---|---|---|---|
| | ESTIMATED SPECTRAL REFLECTIVITY OBTAINED BY KUBELKA-MUNK | | CORRECTED VALUE OF BOUNDARY REFLECTIVITY | ESTIMATED SPECTRAL REFLECTIVITY (R') | | MEASURED SPECTRAL REFLECTIVITY |
| WAVELENGTH (nm) | $X_i$ | $\|X - X_i\|$ | (Rg) | $X_i$ | $\|X - X_i\|$ | X |
| 400 | 12.98 | 0.30 | 0.1084 | 13.02 | 0.26 | 13.28 |
| 420 | 7.46 | 0.05 | 0.1301 | 7.52 | 0.01 | 7.51 |
| 440 | 5.38 | 0.01 | 0.1616 | 5.46 | 0.09 | 5.37 |
| 460 | 5.37 | 0.17 | 0.1614 | 5.47 | 0.27 | 5.20 |
| 480 | 7.57 | 0.10 | 0.1291 | 7.63 | 0.04 | 7.67 |
| 500 | 7.95 | 0.15 | 0.1262 | 7.99 | 0.11 | 8.10 |
| 520 | 8.01 | 0.06 | 0.1257 | 8.06 | 0.01 | 8.07 |
| 540 | 8.63 | 0.17 | 0.1216 | 8.69 | 0.11 | 8.80 |
| 560 | 9.14 | 0.25 | 0.1190 | 9.18 | 0.21 | 9.39 |
| 580 | 9.69 | 0.52 | 0.1167 | 9.72 | 1.49 | 10.21 |
| 600 | 9.73 | 0.70 | 0.1166 | 9.74 | 1.69 | 10.43 |
| 620 | 9.88 | 0.73 | 0.1160 | 9.89 | 1.72 | 10.61 |
| 640 | 9.97 | 0.69 | 0.1157 | 9.97 | 1.69 | 10.66 |

TABLE 4-continued

<table>
<tr><th rowspan="3">WAVELENGTH (nm)</th><th colspan="2">PRIOR ART</th><th colspan="4">(0.5%) INVENTION</th><th rowspan="3">MEASURED SPECTRAL REFLECTIVITY X</th></tr>
<tr><th colspan="2">ESTIMATED SPECTRAL REFLECTIVITY OBTAINED BY KUBELKA-MUNK</th><th>CORRECTED VALUE OF BOUNDARY REFLECTIVITY</th><th colspan="2">ESTIMATED SPECTRAL REFLECTIVITY (R')</th><th></th></tr>
<tr><th>$X_i$</th><th>$|X - X_i|$</th><th>(Rg)</th><th>$X_i$</th><th>$|X - X_i|$</th><th></th></tr>
<tr><td>660</td><td>13.59</td><td>0.71</td><td>0.1076</td><td>13.59</td><td>1.71</td><td>14.30</td></tr>
<tr><td>680</td><td>24.24</td><td>0.72</td><td>0.1021</td><td>24.26</td><td>1.70</td><td>24.96</td></tr>
<tr><td>700</td><td>40.95</td><td>0.57</td><td>0.1010</td><td>41.01</td><td>0.51</td><td>41.52</td></tr>
<tr><td>$\Sigma(X - X_i)^2$</td><td></td><td>3.37</td><td></td><td></td><td>3.18</td><td></td></tr>
</table>

TABLE 5

<table>
<tr><th rowspan="3">WAVELENGTH (nm)</th><th colspan="2">PRIOR ART</th><th colspan="4">(1.0%) INVENTION</th><th rowspan="3">MEASURED SPECTRAL REFLECTIVITY X</th></tr>
<tr><th colspan="2">ESTIMATED SPECTRAL REFLECTIVITY OBTAINED BY KUBELKA-MUNK</th><th>CORRECTED VALUE OF BOUNDARY REFLECTIVITY</th><th colspan="2">ESTIMATED SPECTRAL REFLECTIVITY (R')</th></tr>
<tr><th>$X_i$</th><th>$|X - X_i|$</th><th>(Rg)</th><th>$X_i$</th><th>$|X - X_i|$</th></tr>
<tr><td>400</td><td>7.88</td><td>0.19</td><td>0.1266</td><td>7.94</td><td>0.13</td><td>8.07</td></tr>
<tr><td>420</td><td>4.29</td><td>0.17</td><td>0.1992</td><td>4.40</td><td>0.06</td><td>4.46</td></tr>
<tr><td>440</td><td>3.04</td><td>0.24</td><td>0.2972</td><td>3.23</td><td>0.05</td><td>3.28</td></tr>
<tr><td>460</td><td>2.96</td><td>0.15</td><td>0.3042</td><td>3.18</td><td>0.07</td><td>3.11</td></tr>
<tr><td>480</td><td>4.24</td><td>0.14</td><td>0.2020</td><td>4.35</td><td>0.03</td><td>4.38</td></tr>
<tr><td>500</td><td>4.42</td><td>0.12</td><td>0.1941</td><td>4.51</td><td>0.03</td><td>4.54</td></tr>
<tr><td>520</td><td>4.44</td><td>0.07</td><td>0.1923</td><td>4.55</td><td>0.04</td><td>4.51</td></tr>
<tr><td>540</td><td>4.84</td><td>0.08</td><td>0.1768</td><td>4.94</td><td>0.02</td><td>4.92</td></tr>
<tr><td>560</td><td>5.17</td><td>0.10</td><td>0.1668</td><td>5.26</td><td>0.01</td><td>5.27</td></tr>
<tr><td>580</td><td>5.40</td><td>0.28</td><td>0.1622</td><td>5.44</td><td>0.24</td><td>5.68</td></tr>
<tr><td>600</td><td>5.38</td><td>0.43</td><td>0.1634</td><td>5.39</td><td>1.42</td><td>5.81</td></tr>
<tr><td>620</td><td>5.48</td><td>0.45</td><td>0.1611</td><td>5.48</td><td>1.45</td><td>5.93</td></tr>
<tr><td>640</td><td>5.52</td><td>0.42</td><td>0.1602</td><td>5.52</td><td>1.42</td><td>5.94</td></tr>
<tr><td>660</td><td>7.97</td><td>0.49</td><td>0.1263</td><td>7.97</td><td>1.49</td><td>8.46</td></tr>
<tr><td>680</td><td>16.17</td><td>0.42</td><td>0.1051</td><td>16.18</td><td>1.41</td><td>16.59</td></tr>
<tr><td>700</td><td>30.75</td><td>0.13</td><td>0.1014</td><td>30.78</td><td>1.10</td><td>30.88</td></tr>
<tr><td>$\Sigma(X - X_i)^2$</td><td></td><td>1.28</td><td></td><td></td><td>1.06</td><td></td></tr>
</table>

TABLE 6

<table>
<tr><th rowspan="3">WAVELENGTH (nm)</th><th colspan="2">PRIOR ART</th><th colspan="4">(2.0%) INVENTION</th><th rowspan="3">MEASURED SPECTRAL REFLECTIVITY X</th></tr>
<tr><th colspan="2">ESTIMATED SPECTRAL REFLECTIVITY OBTAINED BY KUBELKA-MUNK</th><th>CORRECTED VALUE OF BOUNDARY REFLECTIVITY</th><th colspan="2">ESTIMATED SPECTRAL REFLECTIVITY (R')</th></tr>
<tr><th>$X_i$</th><th>$|X - X_i|$</th><th>(Rg)</th><th>$X_i$</th><th>$|X - X_i|$</th></tr>
<tr><td>400</td><td>4.64</td><td>0.11</td><td>0.1838</td><td>4.75</td><td>0.00</td><td>4.75</td></tr>
<tr><td>420</td><td>2.57</td><td>0.38</td><td>0.3699</td><td>2.83</td><td>0.12</td><td>2.95</td></tr>
<tr><td>440</td><td>1.88</td><td>0.55</td><td>0.5648</td><td>2.29</td><td>0.14</td><td>2.43</td></tr>
<tr><td>460</td><td>1.74</td><td>0.52</td><td>0.6079</td><td>2.22</td><td>0.04</td><td>2.26</td></tr>
<tr><td>480</td><td>2.48</td><td>0.31</td><td>0.3926</td><td>2.73</td><td>0.06</td><td>2.79</td></tr>
<tr><td>500</td><td>2.61</td><td>0.22</td><td>0.3721</td><td>2.82</td><td>0.01</td><td>2.83</td></tr>
<tr><td>520</td><td>2.52</td><td>0.19</td><td>0.3853</td><td>2.76</td><td>0.05</td><td>2.71</td></tr>
<tr><td>540</td><td>2.65</td><td>0.26</td><td>0.3526</td><td>2.90</td><td>0.01</td><td>2.91</td></tr>
<tr><td>560</td><td>2.86</td><td>0.22</td><td>0.3224</td><td>3.07</td><td>0.01</td><td>3.08</td></tr>
<tr><td>580</td><td>3.03</td><td>0.12</td><td>0.3131</td><td>3.13</td><td>0.02</td><td>3.15</td></tr>
<tr><td>600</td><td>3.07</td><td>0.13</td><td>0.3175</td><td>3.10</td><td>0.10</td><td>3.20</td></tr>
<tr><td>620</td><td>3.16</td><td>0.25</td><td>0.3060</td><td>3.17</td><td>0.11</td><td>3.28</td></tr>
<tr><td>640</td><td>3.17</td><td>0.08</td><td>0.3060</td><td>3.17</td><td>0.08</td><td>3.25</td></tr>
<tr><td>660</td><td>4.53</td><td>0.07</td><td>0.1929</td><td>4.53</td><td>0.07</td><td>4.60</td></tr>
<tr><td>680</td><td>10.02</td><td>0.22</td><td>0.1156</td><td>10.02</td><td>0.22</td><td>9.80</td></tr>
<tr><td>700</td><td>21.83</td><td>0.81</td><td>0.1026</td><td>21.85</td><td>0.83</td><td>21.02</td></tr>
<tr><td>$\Sigma(X - X_i)^2$</td><td></td><td>1.79</td><td></td><td></td><td>0.81</td><td></td></tr>
</table>

Examining Tables 3 to 6, it will be evident that the sum of the squares of the absolute differences between the estimated and measured spectral reflectivities X and $X_i$ at various wavelengths $\Sigma(X-X_i)^2$ is small in the present invention as compared with the conventional method over all the concentrations. Therefore, the present invention is excellent to the conventional method in the consistency between the estimated and measured spectral reflectivities. Particularly, the present invention provides extremely excellent consistency in a deep color area given by the concentration of 2%.

EXAMPLES 4 AND 5

Polyester cloths are dyed to reproduce the same colors as those of a dark blue sample and a dark brown sample.

There were used six kinds of dyestuffs under the tradenames "Sumikaron Yellow SE-RPD", "Sumikaron Red SE-RPD", "Sumikaron Blue SE-RPD", "Sumikaron Yellow Brown S-2RL", "Sumikaron Rubine S-3GF" and "Sumikaron Navy Blue S-GL200%". With each of these dyestuffs, test pieces of polyester cloth were dyed at the concentrations of 0.25, 0.5, 1.5 and 3.0%o.w.f. so that colored reference pieces are prepared, and then measured for spectral reflectivity. Thereafter, based on the measured optical data, the optimum coefficients $f_1$ and $f_2$ and the value (K/S) were calculated on each dyestuff.

On the other hand, there was suitably prepared a tentative dyestuff recipe which would reproduce the color of each given sample. In accordance with the tentative recipe, the treatment similar to that in Example 1 is executed to estimate the spectral reflectivity $R'_{mix}$ of the tentative dyestuff recipe. Thereafter, calculation is made on the basis of the spectral reflectivity $R'_{mix}$ thus obtained, so as to seek the tristimulus values $X_{mix}$, $Y_{mix}$ and $Z_{mix}$ of the possible dyed cloth in accordance with the tentative recipe. These calculated tristimulus values $X_{mix}$, $Y_{mix}$ and $Z_{mix}$ were compared with the tristimulas value Xs, Ys and Zs of the given color sample, and Newton-Lapson method was performed to seek a dyestuff recipe which enables to make the values $X_{mix}$, $Y_{mix}$ and $Z_{mix}$ consistent with Xs, Ys and Zs.

The above mentioned processing was executed by using SICOMUC 20 system of Sumika Chemical Analysis Service, Co., Ltd. At that time, N=1.7 was used. In addition, the correction coefficients $f_1mix$ and $f_2mix$ for the dyestuff mixture was obtained by weighting the correction coefficients $f_1$ and $f_2$ for the respective dyestuffs in accordance with the respective concentration of the dyestuff recipe and averaging the respective weighted coefficients $f_1$ and $f_2$.

Two sets of dyestuff recipes are shown in the following Tables 7 and 8 in comparison with another dyestuff recipes determined in line with a conventional Kubelka-Munk method executed by use of the SICOMUC 20 system and the result of the actual dyeing by the another recipe.

It will be apparent from the above tables that the color matching of the present invention is more excellent than that of the conventional method.

As seen from the above, the color estimating method of the present invention can precisely estimate the spectral reflectivity of a possible colored material, because the linearity between the colorant concentration and the optical density (K/S) is greately improved over all possible concentrations of colorants, particularly at high concentration area. Therefore, the color matching method of the present invention using such a color estimating method can produce a desired color and can reproduce the color of a given sample at extremely small color difference.

We claim:

1. A method of estimating, in terms of spectral reflectivity, the result of coloration by a given colorant recipes including i colorants ($i \geq 1$), each colorant contained in said given recipe being a known concentration $M_i$, characterized by the steps of:

(a) coloring reference pieces by each colorant i with some steps of concentration Ci;

(b) measuring the spectral reflectivity ($R_i'$) of each colored reference piece and also deriving the non-boundary reflectivity ($R_i$) from the said spectral reflectivity ($R_i'$) and the boundary reflectivity ($Rg_i$) in the accordance with the following equation:

$$R_i = R'_i - Rg_i$$

(c) deriving an optial density ($\theta oi$) of the colored layer of each colored reference piece from said non-boundary reflectivity ($R_{oi}$) of the same colored reference piece according to a known equation, and also calculating an optical density ($\alpha oi$) per unit colorant concentration by dividing the optical density ($\theta oi$) by said concentration ($C_i$);

(d) calculating an optical density ($\theta i$) of each colorant (i) contained in said given colarant recipe by multiplying the optical density ($\theta oi$) per unit concentration of said colorant by said concentration ($M_i$) of said colorant (i);

TABLE 7

| | DARK BLUE | | | | | |
|---|---|---|---|---|---|---|
| | INVENTION | | | | PRIPRIOR ART | |
| Dyestuffs | $f_1$ | $f_2$ | FORMURATION (% owf) | COLOR DIFFERENCE | FORMURATION (% owf) | COLOR DIFFERENCE |
| Sumikoron Yellow brown S-2RL | 0.04 | 0.0182 | 0.992 | 0.45 | 1.174 | 1.87 |
| Sumikoron Rubine S-3GF | 0.04 | 0.0186 | 0.983 | | 0.654 | |
| Sumikoron Navy Blue S-GL 200% | 0.04 | 0.0157 | 1.006 | | 0.987 | |

TABLE 8

| | DARK BROWN | | | | | |
|---|---|---|---|---|---|---|
| | INVENTION | | | | PRIPRIOR ART | |
| Dyestuffs | $f_1$ | $f_2$ | FORMURATION (% owf) | COLOR DIFFERENCE | FORMURATION (% owf) | COLOR DIFFERENCE |
| Sumikoron Yellow SE-RPD | 0.04 | 0.0221 | 1.658 | 0.75 | 0.903 | 2.37 |
| Sumikoron Red SE-RPD | 0.04 | 0.0238 | 2.069 | | 1.521 | |
| Sumikoron Blue SE-RPD | 0.04 | 0.0199 | 1.945 | | 1.594 | |

$\theta_i = \alpha_{oi} \cdot M_i$ (e) summing the optical density ($\theta_i$) for i colorants contained in said given colorant recipes to obtain the total optical density $\theta$mix:

$\theta\text{mix} = \Sigma \theta_i$ and (f) calculating the spectral reflectivity (R') of said possible colored material from said total optical density $\theta$mix, thereby estimating the color attained by the given colorant recipe.

2. A color estimating method as set forth in claim 1 in which said boundary reflectivity is calculated on the basis of the following equation:

$$R_g = f_2 \frac{(N-1)^2 + [f_1 \cdot (K/S) \cdot N]^2}{(N+1)^2 + [f_1 \cdot (K/S) \cdot N]^2}$$

where (K/S) is the Kubelka-Munk function resulting from the spectral reflectivity which eliminates influence of the boundary reflectivity, and $f_1$ is a coefficient for converting the value (K/S) into the absorption coefficient K;

$f_2$ is a correction coefficient for the boundary reflectivity;

N is the refractivity of the colored layer.

3. A color estimating method as set forth in claim 2 in which the coefficient $f_1$ is about 0.04 and the coefficient $f_2$ is in a range of 0 to 1.

4. A color estimating method as set forth in claim 2 in which said coefficients $f_1$ and $f_2$ for each colorant is determined by the steps of:

(a) preparing a plurality of recipes j having known concentration ($M_j$) differing from each other;

(b) coloring a plurality of reference substrates by said recipes, respectively;

(c) measuring the spectral reflectivity $R'_j$ of each colored reference substrate under at least one strong absorption wavelength and one weak absorption wavelength;

(d) assuming suitable values for the coefficients $f_1$ and $f_2$;

(e) applying the following equation with each measured spectral reflectivity $R'_j$ by the recipe j, for obtaining the value $(K/S)_j$ which fulfils the same equation;

$$R'_j = 1 + (K/S)_j - \sqrt{(K/S)_j^2 + 2(K/S)_j} + f_2 \frac{(N-1)^2 + [f_1 \cdot (K/S)_j \cdot N]^2}{(N+1)^2 + [f_1 \cdot (K/S)_j \cdot N]^2}$$

(f) analyzing the relation between the value $(K/S)_j$ and the concentration ($M_j$) and statistically seeking the degree of correlation;

(g) repeatedly performing the above procedure by changing the values of the coefficients $f_1$ and $f_2$; and (h) selecting, among the tried values of $f_1$ and $f_2$, the optimum values which provide a good linear relation between the value $(K/S)_j$ and the concentration.

5. A color estimating method as set forth in claim 2 in which said step (g) is executed on the basis of the following equation:

$$(R)_{mix} = 1 + (K/S) - \sqrt{(K/S)^2 + 2(K/S)} + f_2 \frac{(N-1)^2 + [f_1 \cdot (K/S) \cdot N]^2}{(N+1)^2 + [f_1 \cdot (K/S) \cdot N]^2}$$

6. A color estimating method as set forth in claim 2 in which said step (g) is executed by:

(a) deriving a boundary reflectivity $(R_g)_{mix}$ of said possible colored material from said total optical density ($\theta$mix);

(b) deriving a non-boundary reflectivity $(R)_{mix}$ of said possible colored material from said total optical density ($\theta$mix); and (c) calculating the spectral reflectivity $(R')_{mix}$ of said possible colored material from said boundary reflectivity $(R_g)_{mix}$ and said non-boundary reflectivity coefficient $(R)_{mix}$ on the basis of the equation $(R)_{mix} = (R')_{mix} - (R_g)_{mix}$.

7. A color estimating method as set forth in claim 1 in which said step (e) is executed by adding the optical density $\theta_o$ of the substrate to be colored, to $\Sigma\theta_i$ so as to obtain $\theta$mix.

8. A color estimating method as set forth in claim 1 in which said known equation in said step (c) is the following Kubelka-Munk equation:

$$\theta_{oi} = \frac{(1-R)^2}{2R}$$

9. A color estimating method as set forth in claim 1 in which said known equation in said step (c) is the following Pineo equation:

$$\theta_{oi} = \frac{(1-R)^2}{2(1-r)(R-r)}$$

10. A method for reproducing a given color, characterized by the steps of:

(a) coloring reference pieces by each reference colorant i with plural steps of concentration $C_i$;

(b) measuring the spectral reflectivity $(R_i')$ of each colored reference piece and also deriving the non-boundary reflectivity $(R_i)$ from the said spectral reflectivity $(R_i')$ and the boundary reflectivity $(R_{gi})$ in the accordance with the following equation:

$R_i = R'_i - R_{gi}$ (c) assuming a tentative color matching recipe, (d) deriving an optial density ($\theta_{oi}$) of the colored layer of each colored reference piece from said non-boundary reflectivity ($R_{oi}$) of the same colored reference piece according to a known equation, and also calculating an optical density ($\theta_{oi}$) per unit colorant concentration by dividing the optical density ($\theta_{oi}$) by said concentration ($C_i$);

(e) calculating an optical density ($\theta_i$) of each colorant (i) contained in said tentative colarant recipe by multiplying the optical density ($\theta_{oi}$) per unit concentration of said colorant by the concentraion ($M_j$) of said each colorant (i);

$$\theta_i = a_{oi} \cdot M_i$$

(f) summing the optical density $\theta_i$ for i colorants contained in said given colorant recipe to obtain the total optical density $\theta\text{mix}$:

$$\theta\text{mix} = \Sigma\theta_i$$

(g) calculating the spectral reflectivity $(R')_{mix}$ of said possible colored material from said total optical density $\theta\text{mix}$, thereby estimating the color attained by said tentative colorant recipe;

(h) comparing said calculated spectral reflectivity $(R')_{mix}$ of said possible colored material with the spectral reflectivity of said given color;

(i) repeatedly performing the above steps (e) to (g) by changing the concentration of the respective colorants contained in said colorant recipe until said calculated spectral reflectivity is substantially consistent with the spectral reflectivity of said given color so as to obtain an optimum recipe;

(j) performing coloration by using said optimum colorant recipe.

11. A color reproducing method as set forth in claim 10 in which said boundary reflectivity is calculated on the basis of the following equation:

$$R_g = f_2 \frac{(N-1)^2 + [f_1 \cdot (K/S) \cdot N]^2}{(N+1)^2 + [f_1 \cdot (K/S) \cdot N]^2}$$

where $(K/S)$ is the Kubelka-Munk function resulting from the spectral reflectivity which eliminates influence of the boundary reflectivity, and $f_1$ is a coefficient for converting the value $(K/S)$ into the absorption coefficient K;

$f_2$ is a correction coefficient for the boundary reflectivity;

N is the refractivity of the colored layer.

12. A color reproducing method as set forth in claim 11 in which the coefficient $f_1$ is about 0.04 and the coefficient $f_2$ is in a range of 0 to 1.

13. A color reproducing method as set forth in claim 11 in which said coefficients $f_1$ and $f_2$ for each colorant is determined by the steps of:

(a) preparing a plurality of recipes j having known concentration $(M_j)$ differing from each other;

(b) coloring a plurality of reference substrates by said recipes, respectively;

(c) measuring the spectral reflectivity $R'_j$ of each colored reference substrate under at least one strong absorption wavelength and one weak absorption wavelength;

(d) assuming suitable values for the coefficients $f_1$ and $f_2$;

(e) applying the following equation with each measured spectral reflectivity $R'_j$ by the recipe j, for obtaining the value $(K/S)_j$ which fulfils the same equation;

$$R'_j = 1 + (K/S)_j - \sqrt{(K/S)_j^2 + 2(K/S)_j} + f_2 \frac{(N-1)^2 + [f_1 \cdot (K/S)_j \cdot N]^2}{(N+1)^2 + [f_1 \cdot (K/S)_j \cdot N]^2}$$

(f) analyzing the relation between the value $(K/S)_j$ and the concentration $(M_j)$ and statistically seeking the degree of correlation;

(g) repeatedly performing the above procedure by changing the values of the coefficients $f_1$ and $f_2$; and (h) selecting, among the tried values of $f_1$ and $f_2$, the optimum values which provide a good linear relation between the value $(K/S)_j$ and the concentration.

14. A color reproducing method as set forth in claim 11 in which said step (h) is executed on the basis of the following equation:

$$(R)_{mix} = 1 + (K/S) - \sqrt{(K/S)^2 + 2(K/S)} + f_2 \frac{(N-1)^2 + [f_1 \cdot (K/S) \cdot N]^2}{(N+1)^2 + [f_1 \cdot (K/S) \cdot N]^2}$$

15. A color reproducing method as set forth in claim 11 in which said step (f) is executed by:

(a) deriving a boundary reflectivity $(R_g)_{mix}$ of said possible colored material from said total optical density $(\theta\text{mix})$;

(b) deriving a non-boundary reflectivity $(R)_{mix}$ of said possible colored material from said total optical density $(\theta\text{mix})$; and (c) calculating the spectral reflectivity $(R')_{mix}$ of said possible colored material from said boundary reflectivity $(R_g)_{mix}$ and said non-boundary reflectivity coefficient $(R)_{mix}$ on the basis of the equation $(R)_{mix} = (R')_{mix} - (R_g)_{mix}$.

16. A color reproducing method as set forth in claim 10 in which said step (f) is executed by adding the optical density $\theta_o$ of the substrate to be colored, to $\Sigma\theta_i$ so as to obtain $\theta_{mix}$.

17. A color reproducing method as set forth in claim 10 in which said known equation in said step (d) is the following Kubelka-Munk equation:

$$\theta_{oi} = \frac{(1-R)^2}{2R}$$

18. A color reproducing method as set forth in claim 10 in which said known equation in said step (d) is the folloing Pineo equation:

$$\theta_{oi} = \frac{(1-R)^2}{2(1-r)(R-r)}$$

* * * * *

UNITED STATES PATENT AND TRADEMARK OFFICE
CERTIFICATE OF CORRECTION

PATENT NO. : 4,635,213
DATED : January 6, 1987
INVENTOR(S) : Murata et al

It is certified that error appears in the above-identified patent and that said Letters Patent is hereby corrected as shown below:

Column 18, line 41, Change "($\theta$oi)" to --($\alpha$oi)--.

Column 20, line 61, Change "($\theta$oi)" to --($\alpha$oi)--.

Column 20, line 67, Change "($\theta$oi)" to --($\alpha$oi)--.

Signed and Sealed this

Twenty-fourth Day of March, 1987

*Attest:*

DONALD J. QUIGG

*Attesting Officer*     *Commissioner of Patents and Trademarks*